July 24, 1928.
N. D. PRESTON
ADJUSTABLE TRAILING SWITCH CONNECTION FOR RAILROADS
Filed Jan. 13, 1927
1,678,618
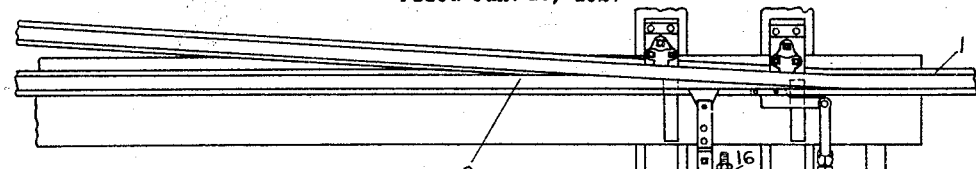
Fig.1.
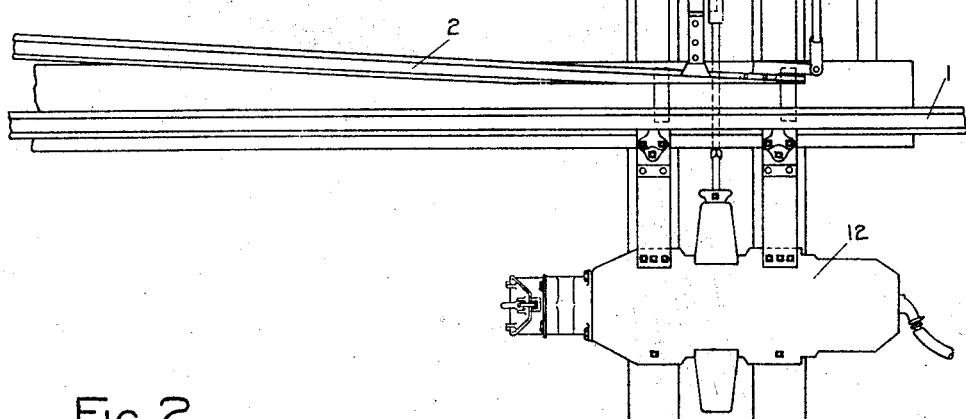
Fig.2.
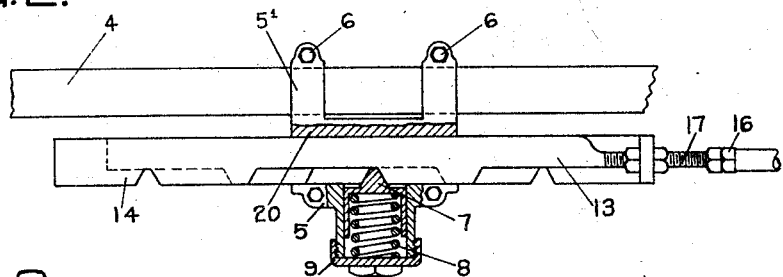
Fig.3.
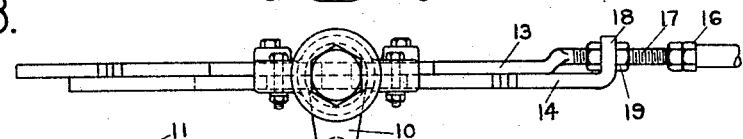
Fig.4.
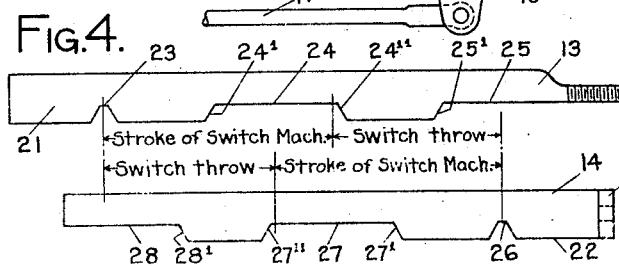
INVENTOR
Neil D. Preston Patented July 24, 1928.

1,678,618

UNITED STATES PATENT OFFICE.

NEIL D. PRESTON, OF ROCHESTER, NEW YORK, ASSIGNOR TO GENERAL RAILWAY SIGNAL COMPANY, OF ROCHESTER, NEW YORK.

ADJUSTABLE TRAILING SWITCH CONNECTION FOR RAILROADS.

Application filed January 13, 1927. Serial No. 160,905.

This invention relates in general to connections for the operation of track switches on railways, and has more particular reference to an adjustable track switch connection arranged to permit trailing of the switch points. It is desirable, in the operation of track switches, that means be provided for permitting the switches to be trailed through by vehicles without damage to the parts, and that the points be locked up or securely held, in one of the thrown positions, after such trailing operation.

Furthermore, when the switch is to be operated by power means, as by any usual or suitable power operated switch machine, it is desirable to have means for adjustably connecting the switch machine throw lever to the track switch, so as to adjust the constant throw of the machine lever to the throw of the switch points, which varies with different switches, and from time to time, in the same switch.

In satisfying the above and other considerations, it is highly desirable that parts of uniform dimension be usable with various switches irrespective of the length of throw of each particular switch.

With the above and other considerations in mind, it is proposed in accordance with this invention, to provide operating means interconnecting a switch machine and a track switch, which will satisfactorily satisfy all of the above features.

Among the objects of this invention are, to decrease the cost of manufacture, improve the efficiency, and lengthen the useful life of devices of the character in question.

Further objects, purposes and characteristic features of the invention will appear as the description progresses, reference being had to the accompanying drawings showing, solely by way of example, one embodiment of the invention. In the drawings:—

Fig. 1 is a plan view of a means in accordance with the invention, together with its associated parts;

Fig. 2 is a sectional view of a detail, with parts shown in elevation;

Fig. 3 is a side elevation of the structure of Fig. 2; and

Fig. 4 is a plan view of two elements in detached position but bearing the same relative, operative position as in the assembled device.

Referring to the drawings, in Fig. 1 is shown a trackway formed of rails 1, having a track switch 2 with its free ends braced by a tie rod 3 and inwardly of its free end, a bar 4. Freely slidable on the bar 4 is a housing 5 having legs 5' straddling the bar 4 and slidably connected thereto by bolts 6. Within the housing 5 is a dog 7, pressed inwardly by a spring 8 having tension adjusting means 9.

Connected to the housing 5, by means of a depending arm 10, is a rod 11 operated with a reciprocating motion by means of a power operated switch machine 12 of any usual or suitable form, the essential thing being that the machine, when energized, shall operate the rod 11 and with it the housing 5, backward and forward, as desired.

In order that the switch machine throw the track switch, when operated, a connection is effected between the housing 5 and the switch by means of two notched operating rods 13 and 14.

The rod 13 is adjustably connected to the track switch by means of a leg 15 on the bar 4 and nuts 16 on the threaded end 17 of rod 13.

The rod 14, as shown best in Fig. 3, has an upturned end 18 through which passes the threaded end 17 of rod 13, whereby the two rods are adjustably connected, by nuts 19, to move together. The two operating rods are positioned, one on the other, and pass through an opening 20 in the housing 5, with their notched edges 21 and 22 presented to the spring pressed dog 7.

Considering each of the two operating rods separately, (see Fig. 4) the rod 13 has a narrow lock notch 23, an elongated notch 24 defined by shoulders 24' and 24", and an elongated notch 25, having a shoulder 25' while the rod 14 has a narrow lock notch 26, an elongated notch 27 defined by shoulders 27' and 27" and an elongated notch 28 having a shoulder 28'.

In practice the device operates as follows:—If it be desired to throw the switch 2 from the main line position as shown in Fig. 1, to siding position, the switch machine is energized to move the rod 11 toward the observer. This will cause the dog 7, to move from its position of Fig. 2, where it is against shoulder 24" of rod 13, through an open space in the rods 13 and 14, until it bears against shoulder 27″ of rod 14, this movement being lost motion, and no movement of the switch 2 occurring. As the switch machine continues its stroke, the switch points are thrown to siding position by movement of rods 13 and 14 and connection 15 by the dog 7.

On reverse movement of the track switch, the first part of the stroke of the switch machine is taken up in lost motion travel from shoulder 27″ of rod 14 to shoulder 24″ of rod 13, after which the switch is thrown by dog 7 operating against the shoulder 24″.

It is clear that relative adjustment of rods 13 and 14 by means of the connection 18, 19, permits varying the amount of lost motion travel of the machine stroke (24″ to 27″) and inversely varying the length of stroke of the switch points (24″ to 26, 27″ to 23) while leaving constant the length of stroke of the switch machine (27″ to 26, and 24″ to 23).

Thus it is possible with this invention, to connect up a switch machine having a given length stroke, with switch points having varying length strokes, by means of rods of uniform design and uniform notching, thus greatly simplifying and cheapening the manufacture of devices of this character.

With the parts in the position of Figs. 1 and 2, let it be assumed that the switch be trailed through by a train coming on to the main track from the siding. The housing 5 being held stationary by the switch machine rod 11, movement of the switch due to trailing, will force rods 13 and 14 through the opening 20, forcing the dog 7 inwardly out of the way, and on completion of the switch throw, lock notch 26 will be opposite the dog 7 which will spring therein and lock the switch points in thrown position. On a reverse trailing of the switch points, a reverse operation takes place involving lock notch 23.

After such trailing as just described, the switch machine can be operated to cam the dog 7 out of the lock notch 23 or 26 as the case may be, and position it in the lost motion space between shoulders 24″ and 27″, when the parts are ready for normal operation once more.

Thus, on trailing of the switch points, no injury is possible to any of the operating parts, and the switch, in the trailed position, is securely locked by a spring detent, until picked up by the switch machine in the normal operating position.

To aid in a ready understanding of this invention, legends have been applied to Fig. 4, clearly indicating the strokes of the switch machine and the switch points. It should be noted that the indicated switch machine stroke lies between two shoulders on the same rod, and hence is constant, as it should be; whereas the indicated switch points stroke lies between shoulders on different rods, and thus is adjustably variable by relative movement of the rods 13 and 14, as it also should be.

While the invention has been described rather specifically, such description is given solely by way of illustration and is not to be considered, in any manner whatsoever, in a limited sense. Obviously, the invention can assume many different physical forms and is susceptible of numerous modifications, and all such forms and modifications are intended to be included in the invention, as come within the scope of the appended claims.

Having described my invention, I now claim:—

1. In a switch connection, in combination, a switch, a switch operator, and an operative connection between the operator and the switch including means permitting trailing of the switch and locking of the switch in trailed position, and means for adjusting the relation of the stroke of the operator to the stroke of the switch.

2. In a switch connection, in combination, a switch, a switch operator, and an operative connection between the operator and the switch including a resilient detent and notched rods, permitting trailing of the switch and locking of the switch in trailed position, and adjusting the relation of the stroke of the operator to the stroke of the switch.

3. In a switch connection, a switch, a switch machine, a detent member operated by the machine, and relatively adjustable notched rods connecting the detent member with the switch.

4. In a switch connection, a switch, a switch machine, a detent member operated by the machine, relatively adjustable notched rods releasably connecting the detent member with the switch, and locking notches in the rods for locking the switch in place after being trailed through.

5. In a switch connection, superimposed, notched rods adjustably connected to each other, the notches being arranged to form a lost motion zone and locking parts, and a rod operator receivable in the notches.

6. In a switch connection, superimposed, notched rods adjustably connected to each other, the notches being arranged to form a lost motion zone, adjustable in size by relative adjustment of the rods and locking parts, and a spring pressed detent receivable in the notches to operate the rods.

7. In a switch connection, two superimposed rods having an adjustable connection therebetween, variously sized and arranged notches in adjacent edges of the rods, the size and arrangement of notches in the edge of one rod being the exact duplicate of that of the other rod, but arranged to run from opposite ends of the two rods, respectively, a switch connected to one of the rods, a detent operating in the rod notches, and a switch machine connected to operate the detent.

8. In a switch connection, a track switch, a switch machine, a housing operably connected to the switch machine by a detent and slidable relatively to the switch, and a plurality of notched rods adjustably connected to the switch and slidable in the housing with their notches in the path of the detent.

9. In a switch connection, a track switch, a switch machine, a housing operably connected to the switch machine and slidable relatively to the switch, a spring pressed detent in the housing, a plurality of overlying, interconnected, relatively adjustable, notched rods adjustably connected to the switch and slidable in the housing with their notches in the path of the detent.

10. In a switch connection, a track switch, a switch machine, a housing operably connected to the switch machine, and slidable relatively to the switch, a spring pressed detent in the housing, a plurality of overlying, interconnected, relatively adjustable, notched rods adjustably connected to the switch and slidable in the housing with their notches in the path of the detent, said notches including lock notches registrable with the detent when the switch is trailed, and a lost motion zone for normally receiving the detent, which is limited by edges of notches in different rods whereby relative adjustment of the notched rods varies the length of the lost motion zone without disturbing the said registry of the lock notches with the detent.

In testimony whereof I affix my signature.

NEIL D. PRESTON.